Aug. 19, 1947.  A. BAK  2,426,077
HEAT INDICATOR
Filed Aug. 9, 1944
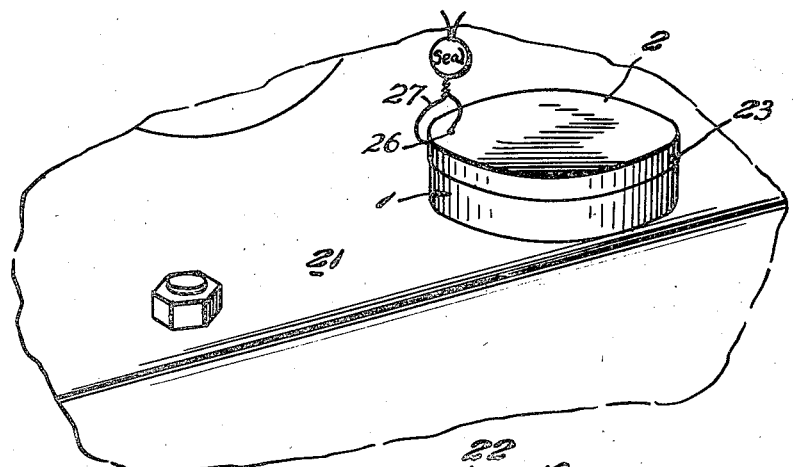
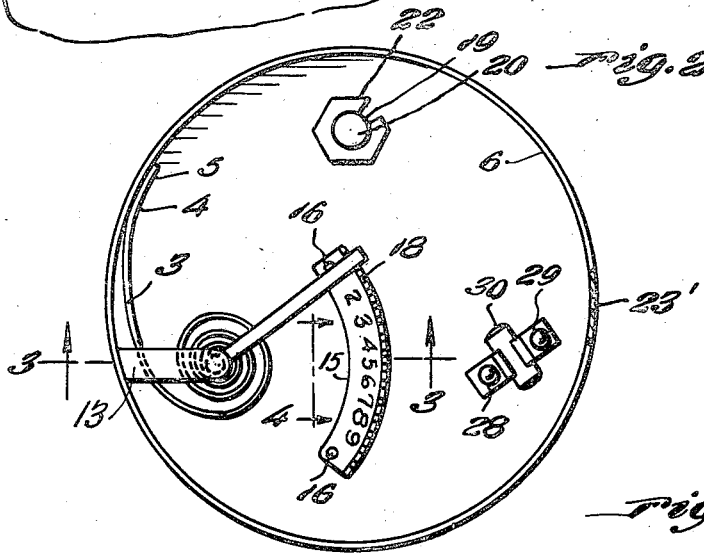
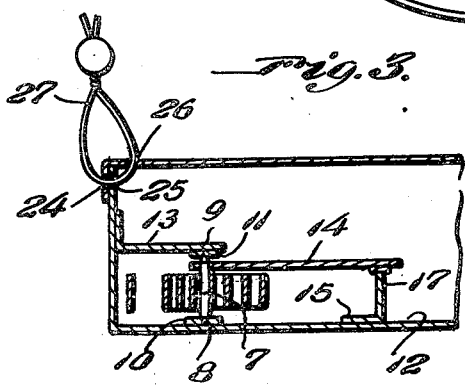
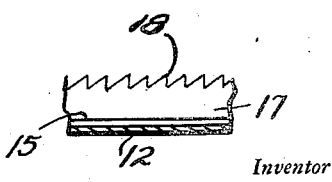
Inventor
Alfred Bak
By Clarence A. O'Brien
and Harvey B. Jacobson
Attorneys Patented Aug. 19, 1947

2,426,077

UNITED STATES PATENT OFFICE 2,426,077

HEAT INDICATOR

Alfred Bak, Irene, S. Dak.

Application August 9, 1944, Serial No. 548,751

1 Claim. (Cl. 73—367)

My invention relates to improvements in heat indicators for use on internal combustion engines, especially, although not necessarily, the primary object in view being to provide a simply constructed, inexpensive, accurate device adapted for easy, quick attachment to, or detachment from, automobile engines of commerce, and responsive to the action of heat generated by such engines to become set so as to register the highest temperature attained in operation of an engine, and which may be sealed, against reading or tampering therewith by unauthorized persons, whereby automobile dealers, owners and others may check on operation of automobile engines as regards abuse by drivers, and defects in the engines.

To the accomplishment of the above, and subordinate objects presently appearing, a preferred embodiment of my invention has been illustrated in the accompanying drawing, set forth in detail in the succeeding description and defined in the claim appended hereto.

In said drawing:

Figure 1 is a view in perspective of the preferred embodiment of my improved indicator applied to an internal combustion engine, Figure 2 is a view in top plan of the indicator, with the closure top removed, and drawn to an enlarged scale, Figure 3 is a detail view in transverse section taken on the line 3—3 of Figure 2, Figure 4 is a fragmentary view in transverse section taken on the line 4—4 of Figure 2.

Referring now to the drawing by numerals, my improved heat indicator, as illustrated, comprises a preferably circular, flat-bottomed casing 1 including a flanged closure cap 2.

A heat responsive member 3 is provided in the casing 1, at one side of the same, and which has the form of a convolute spring of the usual bimetal construction adapting the same to uncoil progressively under successively higher temperatures, which, in this case, may obtain in the casing 1. An outer end 4 of the member 3 is suitably anchored, as at 5, to the side wall 6 of said casing 1, the inner end of said member 3 being similarly fixed to an indicator hand-operating pin 7 upstanding in said casing 1 and provided with needle point bearings 8, 9 in a pair of bearing blocks 10, 11, one suitably fixed to the bottom 12 of said casing 1, and the other suitably fixed to an arm 13 extending from said side wall 6.

An indicator hand 14 is suitably fixed at one end thereof to said pin 7 to be swung thereby over an arcuate indicator bar 15 concentric to the axis of the pin 7 and riveted, as at 16, flat to the bottom 12 of the casing 1. The indicator bar 15 is provided with graduated number symbols, i. e., zero to 9 arranged in ascending order from one end of said bar, and with a right angled flange 17 provided with edge notches 18 one for each symbol and opposite the same, and over which the indicator hand 14 is adapted to wipe and seat in the same, it being understood that said hand is flexible to seat in said notches.

An aperture 19 is provided in the bottom 12 of the casing 1 for the extension therethrough of a stud bolt 20 of an internal combustion engine 21 so that by screwing the nut 22 of said bolt thereon, the casing 1 may be secured flat to said engine.

A stud 23 is provided on the flange of the closure cap 2 for extension through a suitable aperture 23' in the side wall 6 to attach the closure cap 2 to said wall at one side of the casing 1. A pair of complemental apertures 24, 25 are provided in the flange of the closure cap 2 and in the side wall 6 at the opposite side of said casing 1, also an aperture 26 in the top of said cap, at said opposite side of said casing 1, and through which the usual seal 27 may be extended to seal the casing 1 against unauthorized opening.

At any suitable point therein, a resilient clip 28 is riveted, as at 29, to the bottom 12 of the casing 1 to clampingly engage a fuse plug 30 of any suitable metal adapted to melt under under exposure to heat at a high temperature.

Referring now to the operation of the described invention, normally, that is, at normal engine temperature, the indicating hand 14 registers with zero on the indicator bar 15. As the engine 21 becomes heated, the member 3 under the rise of temperature in the casing 1, uncoils and rotates the pin 7 to move the indicator hand into registration with symbols of higher denomination to seat in the corresponding notches 18 whereby it is maintained in the position into which it has been moved. In this connection it is to be noted that the notches 18 are of substantially saw toothed contour as in a ripsaw whereby to cam the flexible indicator hand 14 up and out of the same as the member 3 uncoils and exerts torque against the pin 7 resulting in swinging of said hand 14 to notches 18 of ascending order and catching of said hand 14 in said notches to be held thereby against movement by uncoiling of the member 3.

The symbols on the register bar 15 may refer to heat temperatures on a key chart, not shown, so that the position in which the indicator hand 14 has been moved will indicate a certain temperature on the chart at which the engine has been operated. Thus, by breaking the seal 27 and removing the closure cap 2, the owner of an automobile, or dealer, may ascertain the highest temperature at which an engine has been run. The fuse plug 30 is designed to melt at a temperature higher than that which the indicator hand 14 is capable of indicating, to thereby show that the engine has been operating at an excessively high temperature.

The foregoing will, it is believed, suffice to impart a clear understanding of my invention without further explanation.

Manifestly, the invention, as described, is susceptible of modification without departing from the inventive concept, and right is herein reserved to such modifications as fall within the scope of the appended claim.

What I claim is:

A heat indicating device comprising a casing of material having a low resistance to heat, a thermostatically operative indicator in said casing, a removable cap for the casing for concealing said indicator, said indicator including a graduated numbered indicator bar having notches therein, and an indicator hand movable over said bar with a wiping action, and flexible to snap into said notches and be moved out of the same, said notches having a contour to cam said hand out of the same on movement of the hand in one direction but to prevent movement of the same in the opposite direction.

ALFRED BAK.

REFERENCES CITED

The following references are of record in the file of this patent:

UNITED STATES PATENTS

| Number | Name | Date |
|---|---|---|
| 1,692,551 | Harris | Nov. 20, 1928 |
| 2,209,539 | Ruopp | July 30, 1940 |
| 1,788,794 | Harris | Jan. 13, 1931 |
| 1,746,929 | Clark | Feb. 11, 1930 |